United States Patent [19]

Oda et al.

[11] Patent Number: 4,960,639

[45] Date of Patent: Oct. 2, 1990

[54] MULTILAYERED CONTAINER

[75] Inventors: Hidemasa Oda; Tohei Moritani; Satoshi Hirofuji; Kenji Okuno, all of Kurashiki, Japan

[73] Assignee: Kuraray Co., Ltd., Kurashiki, Japan

[21] Appl. No.: 314,550

[22] Filed: Feb. 23, 1989

[30] Foreign Application Priority Data

Feb. 29, 1988 [JP] Japan ................. 63-47862

[51] Int. Cl.$^5$ ............................. B32B 5/16
[52] U.S. Cl. ...................... 428/34.5; 206/204; 428/34.4; 428/34.6; 428/34.7; 428/35.7; 428/36.4; 428/36.6; 428/36.7; 428/323; 428/324; 428/327; 428/331; 428/515; 428/704; 428/913
[58] Field of Search ............ 428/34.5, 34.4, 34.6, 428/34.7, 35.4, 35.7, 36.4, 36.6, 36.7, 323, 324, 327, 331, 515, 704, 913; 206/204

[56] References Cited

U.S. PATENT DOCUMENTS

| | | | |
|---|---|---|---|
| 4,425,410 | 1/1984 | Farrell et al. | 428/35.4 |
| 4,526,823 | 7/1985 | Farrell et al. | 428/34.7 |
| 4,528,235 | 9/1985 | Sacks et al. | 428/323 |
| 4,536,425 | 8/1985 | Hekal | 428/36.6 |
| 4,618,528 | 10/1986 | Sacks et al. | 428/331 |
| 4,619,849 | 10/1986 | Anzawa et al. | 428/35.7 |
| 4,626,456 | 11/1986 | Farrell et al. | 428/323 |
| 4,640,852 | 2/1987 | Ossian | 428/35.4 |
| 4,741,936 | 5/1988 | Nohara et al. | 428/36.7 |
| 4,774,114 | 9/1988 | Moritani et al. | 428/36.6 |
| 4,792,484 | 12/1988 | Moritani . | |
| 4,818,782 | 4/1989 | Bissot | 524/413 |

FOREIGN PATENT DOCUMENTS

| | | |
|---|---|---|
| 57-32939 | 7/1982 | Japan . |
| 58-22327 | 5/1983 | Japan . |
| 62-148532 | 7/1987 | Japan . |
| 63-11335 | 1/1988 | Japan . |
| 63-11336 | 1/1988 | Japan . |

OTHER PUBLICATIONS

A. Brockschmidt, *Plastics Technology*, Dec., 1987, pp. 77–79, "Coextrusion Developments Focus on Barrier Resins".

*Primary Examiner*—Ellis P. Robinson
*Assistant Examiner*—Archene Turner
*Attorney, Agent, or Firm*—Kramer, Brufsky & Cifelli

[57] ABSTRACT

Provided are multilayered containers comprising a layer of a composition comprising a gas barrier resin, particularly ethylene-vinyl alcohol copolymer, incorporating an inorganic powder such as mica, and a layer of a composition comprising a thermoplastic resin incorporating an inorganic powder such as mica. The containers are excellent in gas barrier properties, particularly in gas barrier properties after being retorted, while showing very little deformation during retort treatment, and further excellent in mechanical strengths.

8 Claims, No Drawings

MULTILAYERED CONTAINER

BACKGROUND OF THE INVENTION

1. Field of the invention

This invention relates to multilayered containers being excellent in food keeping performances due to their high gas barrier properties, particularly to containers excellent in performances for storing retorted foods.

2. Description of the prior art

Ethylene-vinyl alcohol copolymer resin (hereinafter sometimes referred to as EVOH) is a thermoplastic resin having a high gas barrier property, and is used for containers for storing a wide variety of foods. However, for containers which are subjected to retort sterilization, i.e. sterilization in a hot water having a high temperature of at least 100° C., particularly at 105° to 135° C., under high pressure, there having been a problem that the gas barrier property decreases due to moisture absorbed into EVOH by the treatment. Blending of inorganic powder such as mica into a resin to increase its gas barrier property has been proposed. For example Japanese Pat. Publication No. 32939/1982 disclosed that the oxygen permeability of polypropylene (hereinafter sometimes abbreviated as PP) blended with 30% of mica is lower than that of PP not blended therewith. Plastic Technology (December 1987, pages 77 to 79) describes that incorporation of mica into EVOH improves the gas barrier property, Japanese Pat. Application Laid-Open No. 148532/1987 disclosed a gas barrier film comprising a blend of a thermoplastic resin such as EVOH, and mica. Further, Japanese Pat. Publication No. 22327/1983 disclosed that molded articles having excellent mechanical properties are obtained by melt molding a composition comprising EVOH and mica, and Japanese Pat. Application Laid-Open Nos. 11335/1988 and 11336/1988 disclose that multilayered structures can be obtained by laminating a layer comprising a thermoplastic resin incorporating mica with a layer of another thermoplastic resin.

SUMMARY OF THE INVENTION

When a hydrophilic gas barrier resin, particularly EVOH, is used for a gas barrier layer for containers for retorting, the oxygen gas transmission rate (OTR) decreases due to moisture absorption of the gas barrier resin, whereby the thickness of the gas barrier resin layer should be made larger than that of materials for non-retortable containers. This is not favorable in terms of cost. Further, prolongment of shelf life of plastic containers to improve food keeping performances has been strongly desired.

The present inventors have made an extensive study to improve gas barrier properties of containers, in particular retortable containers utilizing a hydrophilic gas barrier resin, particularly EVOH. As the result of the study, the present inventors have found that containers having high gas barrier properties can be obtained by laminating a composition (A) comprising EVOH and at least one inorganic powder selected from the group consisting of mica, sericite, talc and glass flake and a composition (B) comprising a thermoplastic resin such as PP and at least one inorganic powder selected from the group consisting of mica, sericite, talc and glass flake; in particular, especially high gas barrier containers can be obtained by providing the blend layer (B) of the inorganic powder and the thermoplastic resin at the inside of the EVOH blend layer (A); and completed the invention. Further the inventors found that containers having still higher gas barrier properties can be obtained by incorporating in either of the layers, preferably in layer (A), of the multilayered containers, fine particles of a drying agent.

DETAILED DESCRIPTION OF PREFERRED EMBODIMENTS

The inorganic powder used in the present invention is selected from the group consisting of mica, sericite, talc and glass flake. Such inorganic powders may be used singly or in admixtures of two or more. Further, inorganic powders used in layers (A) and (B) may be the same or different. Mica is particularly preferred among the above inorganic powders.

Mica is suitably selected from among muscovite, phlogopite, biotite, soda mica, synthetic micas and the like.

There is no particular limitation to the shape of the inorganic powders used in the invention but, they preferably have a weight average aspect ratio of at least 10 and a weight average flake diameter of not more than 50 $\mu$.

The weight average flake diameter of an inorgaic powders (particularly mica powders) as referred to in the present invention is determined by the following procedure:

Classify the powder with microsieves and sieves having various openings, and plot the result on Rosin-Rammlar chart. Read from the chart the opening, $e_{50}$, of the microsieve or sieve passing 50% of the total weight of the powder. Then, the weight average flake diameter, e, is defined by the formula (1) or (2):

$$e = e_{50} \text{ (in the case of microsieve)} \quad (1)$$

$$e = \sqrt{2}\, e_{50} \text{ (in the case of sieve)} \quad (2)$$

wherein large particles in the powder are classified through sieves, while minute particles are classified through microsieves.

The weight average aspect ratio, $\alpha$, of an inorganic powder referred to in the present invention means a value calculated from the weight average flake diameter, e, and the weight average flake thickness, d, of the inorganic powder, determined by a method given below, from the formula (3):

$$\alpha = e/d \quad (3)$$

The weight average flake thickness, d, is a value calculated using the formula (4) from the water surface area, S, occupied by the flake determined by a method proposed in a paper "particle Size Measurement by a Powder Film Method" by C. E. CaPes and R. C. Coleman, {Ind. Eng. Chem. Fundam., Vol. 12, No.1, p.124–126 (1973)}, in which the mean particle size is determined by measuring the compressed area of a monoparticulate film of the powder spread on a liquid surface:

$$d = \frac{W}{\rho(1-\epsilon) \cdot S} \quad (4)$$

wherein W is the weight of powder measured, $\rho$ is the specific gravity of the powder and $(1-\epsilon)$ is the ratio of area occupied by the powder to the total surface area of water when the powder is in a closest packing state on the water surface, and is generally 0.9 for mica powder.

The gas barrier resins used in the invention for forming the layer of composition (A) are preferably those exhibiting an oxygen transmission rate measured at 20° C., 65% RH (relative humidity) of not more than 300cc·20μ/m²·day·atm. And hydrophilic gas barrier resins, particularly EVOH, are most preferred. Ethylene-vinyl alcohol copolymer (EVOH) may include any polymer as long as it is obtained by hydrolyzing vinyl acetate component of a copolymer of ethylene and vinyl acetate. As EVOH's particularly suited for the purpose of the present invention, mentions are made of those having an ethylene content of 20 to 50 mol%, particularly 27 to 40 mol%, a saponification degree of vinyl acetate component of at least 96%, preferably at least 99%, and a melt index (190° C,. 2160 g) of 0.2 to 60 g/10 min. The EVOH in the present invention may be one modified with not more than 5 mol% of a copolymerizable monomer. Examples of such modifying monomer include, among others, propylene, 1-butene, 1-hexeme, 4-methyl-1-pentene, acrylic acid esters, methacrylic acid esters, maleic acid, fumaric acid, itaconic acid, higher fatty acid vinyl esters, alkylvinyl ethers, N-(2dimethylaminoethyl) methacrylamides or quaternary compounds thereof, N-vinylimidazole or its quaternary compound, N vinylpyrrolidone, N,N-butoxymethylacrylamide, vinyltrimethoxysilane, vinylmethyldimethoxysilane and vinyldimethylmethoxysilane.

The hydrophylic gas barrier resins also include polyvinyl alcohol, vinyl alcohol copolymers other than EVOH, polyamides and the like resins.

Examples of polyamide resins (hereinafter sometimes referred to as PA) include, among others, polycaprolactam (nylon-6), poly-ω-aminoheptanoic acid (nylon-7), poly-ω-aminononanoic acid (nylon-9), polyundecaneamide (nylon-11), polylauryl lactam (nylon-12), polyethylenediamine adipamide (nylon-2,6), polytetramethylene adipamide (nylon-4,6), polyhexamethylene adipamide (nylon-6,6), polyhexamethylene sebacamide (nylon-6,10), polyhexamethylene dodecamide (nylon6,12), polyoctamethylene adipamide (nylon-8,6); polydecamethylene adipamide (nylon 10,6) and polydodecamethylene sebacamide (nylon-10,8); copolymers such as caprolactam/lauryl lactam copolymers (nylon-6/12), caprolactam/ω-aminononanic acid copolymers (nylon-6/9), caprolactam/hexamethylene diammonium adipate copolymers (nylon-6/6,6), lauryl lactam/hexamethylene diammonium adipate copolymers (nylon-12/6,6), hexamethylene diammonium adipate/hexamethylene diammonium sebacate copolymers (nylon 6,6/6,10 , ethylene diammonium adipate/hexamethylene diammonium adipate copolymers (nylon 2,6/6,6), caprolactam/hexamethylene diammonium adipate/hexamethylene diammonium sebacate copolymers (nylon-6/6,6/6,10), polyhexamethylene isophthalamide, polyhexamethylene terephthalamide, hexamethylene isophthalamide/terephthalamide copolymers; and metaxylylene-containing polyamides such as polymetaxylylene adipamide, polymetaxylylene sebacamide, polymetaxylylene suberamide, metaxylylene/paraxylylene adipamide copolymers, metaxylylene/paraxylylene piperamide and metaxylylene/paraxylylene azelamide.

The other gas barrier resins in the present invention further include polyvinylidene chloride (e.g. vinylidene chloride-vinyl chloride copolymers), polyacrylonitrile, saturated polyesters (e.9. polyethylene terephthalate), polyester amides, and the like. These gas barrier resins may be used singly or in a blend of two or more.

Particularly, a blend of EVOH and polyamide resin may be preferably used because of the excellent thermoformability thereof.

As representative thermoplastic resins constituting composition (B) of the present invention, hydrophobic thermoplastic resins, particularly polyolefins are mentioned.

Examples of the polyolefin resins used in the invention include, among others, high density, medium density or low density polyethylene; copolymers of polyethylene with vinyl acetate, acrylic acid esters, or α-olefins such as butene, hexene, 4-methyl-1-pentene; ionomers; polypropylene homopolymer; polypropylene grafted with ethylene; copolymers of propylene with α-olefins such as ethylene, hexene, 4-methyl1-pentene and the like; poly-1-butene, poly-4-methyl 1-pentene and modified polyolefins comprising above-mentioned polyolefins modified with maleic anhydride or the like. Among the above, polypropylene (PP) is the most suited for the purpose of the present invention.

The thermoplastic resins constituting composition (B) of the present invention further include polyamides, polyesteramides, saturated polyesters, polystyrene, polyvinyl chloride, polyacrylonitrile, polyvinylidene chloride, polyurethanes, polyvinyl acetate, polyacetals, polycarbonates and the like.

It should be noted that one and the same resin is not used for layer (A) and layer (B) at the same time The amount of the inorganic powder incorporated in the layer of composition (A) is selected from the range of from 5 to 50 wt%, preferably from the range of from 20 to 40 wt% based on the weight of composition (A). If the incorporation amount is less than 5%, the improvement effect of the inorganic powder on the gas barrier property will rapidly decrease; while with the amount exceeding 50%, the improvement effect also decreases and the fluidity at melting of the composition decreases too.

The amount of the inorganic powder incorporated in the layer of composition (B) is selected from the range of from 3 to 60 wt%, preferably from the range of from 5 to 40 wt%, based on the weight of composition (B). Lamination of the layer of composition (B) containing an inorganic powder on the layer of composition (A) containing an inorganic powder sharply improves the gas barrier property, as well as improves the mechanical strength of the container utilizing the laminate, thereby improving the resistance of the container to deformation in the course of retort sterilization.

The drying agents preferably used in the present invention are salts capable of forming a hydrate, i.e. salts which absorbs water as the crystalline water. Particularly preferred among such salts are phosphates such as sodium dihydrogen phosphate, disodium hydrogen phosphate, trisodium phosphate and sodium pyrophosphate, and anhydrides thereof. Also used preferably are other hydrate-forming salts, e.g. sodium borate, sodium sulfate, and particularly, anhydrides thereof; and other hygroscopic compounds, e.g., sodium chloride, sodium nitrate, sugar, silica gel, bentonite, molecular sieve, super-absorbent polymers, and the like. These compounds may used singly or in combination of two or more.

There are no particular limitations to the shape of the drying agent powder used in the present invention but, it is preferred that the drying agent grains comprise particles with a maximum length of at least 10 μ having an volume-area average diameter of not more than 30 μ, more preferably not more than 25 μ, most preferably not more than 20 μ.

Such minute particles are obtained, for example by the following procedure.

First of all, it is desired, when separating out a salt from its aqueous solution by spraying and drying, to pay special attention to obtain particles having as small a diameter as possible. The thus obtained salt particles may be used after being classified into particles having a diameter of not more than 30 μ, preferably not more than 10 μ but, generally the salts dried are subjected to ultrafine pulverization using a jet grinder, a percussion pulverizer, a ball mill, a vibration ball mill or the like. The powder thus pulverized is classified through a classifier such as pneumatic classifier into particles of ultrafine grade, having a diameter of not more than 30 μ, preferably not more than 10 μ.

The term "not more than 30 μ'''" as used herein means that particles having a diameter exceeding 30 μ are present in an amount less than 0.01% based on volume, i.e., particles having a diameter of not more than 30 μ are at least 99.9% of the total volume. The particle size of the thus obtained ultrafine particles are measured with the Coulter counter. In the particle size measurement, for the purpose of obtaining the size more accurately, the particles are preliminary sieved through a coarse sieve having a mesh of 10 to 75 μ, if necessary, in order to condense a small amount of coarse particles and, the coarse particles on the sieve are then analyzed using the Coulter counter.

The amount of the drying agent particles incorporated in composition (A) or composition (B) is at least 3 wt%, preferably in a range of 5 to 30 wt% based on the composition, to obtain a container having a particularly high gas barrier property.

A gas barrier resin such as EVOH is contained in composition (A) preferably in an amount of at least 40 wt%, more preferably at least 50 wt% based on the weight of the composition (A).

Also preferably used for composition (A) is a blend of EVOH and a polyamide, since it is excellent in thermoformability. In this case preferred contents of EVOH and the polyamide are at least 30% by weight and 5 to 40% by weight, respectively, based on composition (A).

Next, described is the preparation methods for the composition used for the layer of composition (A).

For blending EVOH with an inorganic powder, or further with a drying agent, there are employed a method which comprises mixing EVOH powder or EVOH pellets with the inorganic powder through a conventional mixer, e.g. a Henshel Mixer, a super mixer, or a tumbler; and a method which comprises first preparing a master batch by mixing an EVOH melt with the inorganic powder, followed by blending thereof with the powder the particles, the pellets or the melts of EVOH. The blend thus obtained is then kneaded at temperatures higher than the melting point of EVOH to give the desired composition. Further, EVOH and an inorganic powder may be directly fed, without the preliminary mixing described above, to a kneader where they are kneaded together. The most suited kneaders for obtaining a composition having a highly uniform dispersion are continuous kneaders such as a continuous intensive mixer, a kneading-type twin screw extruder ( same direction or different directions). Batch-type kneaders such as a Banbury mixer, an intensive mixer and a compression kneader may also be used. Further as other continuous mixing devices, there may also be used rotary disks having an attrition mechanism such as a stone mill, e.g., KCK kneader extruder manufactured by KCK Co. Single screw extruders equipped with a kneading section (Dulmage, CTM, etc.) or handy type kneaders such as a Brabender mixer are also available.

Of these kneaders, the most preferred kneader for the purpose of the present invention is a continuous intensive mixer Commercially available models are FCM manufactured by Farrel Co,, CIM manufactured by The Japan Steel Works, KCM, NCM, LCM or ACM manufactured by Kobe Steel Works and the like.

From a practical standpoint, it is preferred that a device equipped with a kneader having mounted a single screw extruder beneath the kneader be adopted to perform kneading and extrusion pelletization simultaneously.

The kneading of the inorganic powder and, if necessary, fine particles of drying agent such as sodium dihydrogen phosphate with a thermoplastic resin, both of which are used in the layer of composition (B), can be performed in a manner similar to that described above.

The multilayered structure of the present invention can be produced by various lamination processes such as co-extrusion, dry lamination, sandwich lamination, extrusion lamination and co-extrusion lamination, among which co-extrusion gives the best result. In the co-extrusion process, the layer of composition (B) may be incorporated with, as one of starting materials, scraps that form in the course of the manufacture of the multilayered container of the present invention. On this occasion, the layer of composition (B) contains, in addition to a thermoplastic resin (e.g. polyolefin), inorganic powder and drying agent, also EVOH and an adhesive resin, which fact does not adversely affect the effect of the present invention. When scraps are reused, if the content of inorganic powder becomes short, there may be added a composition comprising the inorganic powder and a thermoplastic resin, particularly polyolefin, as a master batch. Further, scraps may be utilized for constituting a layer independent from layers (A) and (B).

The layer of composition (B) exhibits its effect either when it is provided on both sides or one side of the layer of composition (A). It has, however, been found that particularly high improvement effect on the gas barrier property when composition (B) is provided only inside the layer of composition (A). In this case, there may be provided outside the layer of composition (A) one or more than two layers of a thermoplastic resin, preferably a polyolefin, in particular, PP.

Further, when the multilayered container of the present invention is produced by co-extrusion, there is employed a knoWn technique of laminating the principal layers (A) and B) with an adhesive resin interposed between them. As the adhesive resin used here, mentions are made of modified resins comprising polyolefins such as polypropylene, polyethylene, copolymers of ethylene and a monomer copolymerizable therewith (e.g. vinyl acetate, acrylic acid ester or the like), and the like, modified by addition of maleic anhydride and the like. The layer of the adhesive resin may also be incorporated with the afore-mentioned inorganic powder and/or fine particles such as sodium dihydrogen phosphate.

One or more than two layers of the multilayered container of the present invention may incorporate, within limits not to impair the purpose of the present invention, other polymers or additives such as antioxidants, ultraviolet absorbers, plasticizers, antistatic agents, lubricants, colorants and fillers. Examples of the additives other than the polymers are as follows:

Stabilizers: calcium acetate, calcium stearate, hydrotalcites, metal salts of ethylenediaminetetraacetic acid and the like.

Antioxidants: 2,5-di-t-butylhydroquinone, 2,6-di-t-butyl-p-cresol, 4,4′-thiobis-(6-t-butylphenol), 2,2′-methylenebis(4′-methyl-6-t-butylphenol), octadecyl-3 (3′,5′-di-t-butyl-4′-hydroxyphenyl)propionate, 4,4′-thiobis-(6-t-butylphenol) and the like.

Ultraviolet absorbers: ethyl-2-cyano-3,3-diphenylacrylate, 2-(2′-hydroxy-5′-methylphenyl)benzotriazol, 2-(2′-hydroxy-3′-t-butyl-5′-methylphenyl)-5-chlorobenzotriazol, 2-hydroxy-4-methoxybenzophenone, 2,2′-dihydroxy-4-methoxybenzophenone, 2-hydroxy-4-octoxybenzophenone and the like.

Plasticizers: dimethyl phthalate, diethyl phthalate, dioctyl phthalate, wax, liquid paraffin, phosphoric acid esters and the like.

Antistatic agents: pentaerythrit monostearate, sorbitan monopalmitate, oleic acid sulphate, polyethylene oxide, carbo wax and the like.

Lubricants: ethylenebisstearoamide, butyl stearate and the like.

Colorants: carbon black, phthalocyanine, quinacridone, indoline, azo-dyes, titanium oxide, Indian red and the like.

Fillers: glass fiber, asbestos, mica, ballastonite, calcium silicate, aluminum silicate, calcium carbonate and the like.

The above-described multilayered containers of the present invention are used for food packaging as follows: It is filled with a food, and, as required, the inside is deaerated or the air inside is replaced by an inert gas such as nitrogen or carbon dioxide by a known method. Then the package is tight-sealed by heatsealing or the like, and then subjected to retort sterilization.

Foods to be packed are suitable those already cooked, which are taken as they are, or those half cooked, which are warmed up before being taken. Examples of such foods are as follows:

Cooked curry, cooked hash, stewed beef, borsch, meat sauce, braised pork with sweet vinegared sauce, sukiyaki, sauté and chops-suey, boiled meat & potato, Japanese hotchpotch, asparagus boiled, sweet corn, mushroom, tuna cream-boiled, soups such as consommé, potage, miso-soup, pork & vegetable soup and "Kenchin" soup, boiled rice, rice and red beans boiled, boiled-in-iron-pot rice with subsidiaries ("Kamameshi"), roast rice, pilaf, rice-gruel, spaghetti, cooked buckwheat vermicelli, Japanese noodle, Chinese noodle, noodle, seasonings such as ones or Kamameshi and for Chinese noodles, boiled red beans, thick bean-meal soup with sugar and rice cake ("Zenzai"), boiled peas with honey and bean-jam ("Anmitsu"), quenelles, hamburgers, beef stakes, roast porks, pork souté, corned beef, ham, sausage, grilled fishes, roast meat, roast fowls, roast chicken, smoked fishes, bacon, boiled fish paste, pudding, jelly, sweet jelly of beans ("Yokan") and various pet foods.

The multilayered containers of the present invention are also superior for containers for fruits such as orange, peach, pineapple, cherry and olive; condiments such as soybean sauce, sauce, vinegar, sweet sake, dressings, mayonnaise, catsups, edible oil, miso and lard; bean curd; jam; butter; margarine; fruit juices; vegetable juices; beer; cola; lemonade; sake; distilled spirits; fruit wines; wines; whisky and brandy. Further the containers of the present invention can be used for containing medicines such as Ringer's solution, agricultural chemicals, cosmetics, washing agents or organic liquid chemicals, e.g. benzene, toluene, xylene, acetone, methylethyl ketone, normal hexane, kerosene, petrolium benzine, thinner, grease, etc.

According to the present invention there can be obtained multilayered containers which are excellent in gas barrier properties, particularly that after retort sterilization, with very small deformation during retorting, and having excellent mechanical properties.

Other features of the invention will become apparent in the course of the following descriptions of exemplary embodiments which are given for illustration of the invention and are not intended to be limiting thereof. In the Examples "parts" means parts by weight.

EXAMPLE 1

70 parts of powder of a resin having an ethylene content of 30 mol% and a melt index (190° C., 2160 g) of 1 g/10 min as EVOH and 30 parts of muscovite powder having a weight average flake diameter of 20 μ, weight average aspect ratio of 35 and a brightness by Hunter of 50 were blended well and the blend was then melt-extruded through a same direction twin-screw extruder having a diameter of 30 mm (die temperature: 230° C.) to give blend pellets (Composition-A1). Separately, 30 parts of the above-mentioned muscovite and 70 parts of pellets of PP (Mitsubishi Noble X-1B (trademark), made by Mitsubishi petrochemical Co.) were each fed through a different feeder to the above-mentioned extruder (die temperature: 240° C.) to give blend pellets (Composition-B1). Then, a multilayered sheet having a construction of, from outside, PP/ad/Composition-A1/ad/Composition-B1/pP (thickness: 550/50/120/50/400/150 μ was obtained through a co-extrusion sheet former of feed-block type equipped with 4 extruders and a T die. As the adhesive resin (ad) Modic P300F (trademark) (an ethylene-vinyl acetate copolymer grafted with maleic anhydride) made by Mitsubishi Petrochemical Co. The thus obtained multilayered sheet was thermoformed into cup-shape container with a round bottom having a radius of 33 mm, a circular open top having a radius of 37 mm and a height of 37 mm using a vacuum air-pressure thermoforming machine (made by Asano Laboratories). The thickness construction of the cup was, from outside, 204/19/44/19/148/56 μ (harmonic mean thicknesses). After replacement of inside air by nitrogen gas, the cup was filled with 5 ml of deaerated water and heatsealed with a lid made of a laminate film of aluminum foil/polypropylene. Then the cup was retorted at 120° C. for 30 minutes. After being taken out from the retorting oven, the cup was stored for 6 months at 20° C., 65% RH. The oxygen gas concentration in the cup after the storage was measured by gas chromatography to be 0.32%, which would correspond to an oxygen gas absorption, when the container is packed with an aqueous food, of 4 ppm. This concentration value is sufficiently low for protecting various foods from degradation by oxygen. The container showed almost no deformation at retorting, and was excellent in mechanical strength.

COMPARATIVE EXAMPLES 1 AND 2

Example 1 was repeated except that in the co-extrusion of a multilayered sheet, Composition-A1 and Composition B 1 were not used, while EVOH (one used as starting material of Composition-A1) was used instead of the former and PP instead of the latter. The container thus obtained was evaluated for the storage performance (Comparative Example 1). Example 1 was further repeated except for using EVOH instead of Composition-A1 to obtain a container, which was then also evaluated (Comparative Example 2). The oxygen concentrations in the containers (corresponding oxygen absorption when the container was packed with aqueous food) were 1.17% (15 ppm) and 0.93% (12 ppm) respectively.

COMPARATIVE EXAMPLE 3

Example 1 was repeated except for using PP instead of Composition-B1 to obraine a container. The obtained container was evaluated for storage performance to give an oxygen concentration in the container stored for 6 months (corresponding oxygen absorption when the container was packed with an aqueous food) of 0.78% (10 ppm).

EXAMPLES 3 THROUGH 11

ExamPle 1 was repeated several times changing the types and the amounts blended of the inorganic powders used for Composition-A1 and Composition-B1 as shown in Table 1 to obtain various containers. They were evaluated for storage performance, the results being shown in Table 1. In the Table. "layer A" or "layer B" mean the layer of Composition-A1 or -B1 in Example 1. These containers deformed very little at retorting, and had excellent mechanical strengths.

TABLE 1

| Example | Inorganic powder | Shape of inorganic powder flake diameter μ | Shape of inorganic powder aspect ratio | Content of inorganic powder % by weight in layer (A) | Content of inorganic powder % by weight in layer (B) | Oxygen absorption after storage for 6 months, ppm |
|---|---|---|---|---|---|---|
| 3 | muscovite | 20 | 35 | 15 | 55 | 5.1 |
| 4 | muscovite | 20 | 35 | 50 | 30 | 3.5 |
| 5 | phlogopite | 13 | 25 | 30 | 40 | 3.8 |
| 6 | phlogopite | 13 | 25 | 40 | 30 | 3.7 |
| 7 | sericite | 5 | 10 | 40 | 10 | 5.8 |
| 8 | sericite | 5 | 10 | 30 | 5 | 5.1 |
| 9 | talc | 8 | 15 | 50 | 30 | 3.9 |
| 10 | glass flake | 55 | 20 | 20 | 20 | 5.2 |
| 11 | glass flake | 55 | 20 | 25 | 40 | 5.2 |

EXAMPLE 12

A multilayered sheet was obtained in the same manner as in Example 1 with the sheet construction, reverse to Example 1, of, from outside, PP/Composition-B1/ad/Composition-A1/ad/PP (thickness: 150/400/50/120/50/550 μ). The obtained sheet was evaluated in the same manner as in Example 1 to give an oxygen absorption during 6 months of 5.8 ppm.

EXAMPLE 13

A multilayered sheet having a sheet construction of, from outside, PP/Composition-B1/ad/Composition-A1/ad/Composition-B1/PP (thickness:150 400/50/120/50/400/150 μ)in the same manner as in ExamPle 1. Following the same procedures as in Example 1, the sheet was formed into a container, which was then measured for an amount of oxygen absorbed in 6 months after retorting, to give a result of 4.9 ppm.

EXAMPLE 14

50 parts of EVOH and 30 parts of muscovite used in Example 1, and 20 parts of anhydrous disodium hydrogen phosphate powder (average particle diameter: 5.5 μ by median diameter) were blended well, and the blend was formed into blend pellets (Composition-C1) in the same manner as in Example 1. From the thus obtained pellets, a multilayered sheet having a construction of PP/ad/Composition C1/ad/PP, which was then formed into a container, in the same manner as in Example 1. The container was retorted and measured for the oxygen absorption when kept for 6 months after the retorting, to show 2.9 ppm. The container deformed very little, and was excellent in mechanical strength.

EXAMPLE 15

A container having a construction of, from outside, PP/ad/Composition-C1/ad/Composition-B1/PP using the blend pellets (Composition-C1) prepared in Example 14 in the same manner as in Example 1. The container thus obtained was retorted and measured for the oxygen absorption during 6 months after the retorting to give 2.1 ppm.

EXAMPLE 16

The trim of the sheet in Example 1 was crashed to give granules having a size of about 5 mm (E1). The content of mica in E1 was 14 % by weight. 81 parts of E1 and 19 parts of mica (muscovite) were fed to a same direction twin-screw extruder used in Example 1 to give blend pellets (Composition-F1). The content of mica in F1 was 30% by weight.

The pellets were formed into a container in the same manner as in Example 1 except for using F1 instead of B1. The container thus obtained was evaluated for storage performance. The oxygen absorption in the container stored for 6 months was 4.1 ppm.

EXAMPLE 1-a

70parts of pellets of an EVOH having an ethylene content or 32 mol%, a melt index (190° C., 2160 g) of 1.3 g/10 min and a melting point of 181° C. {a principal endotherm by DSC (scanning speed: 10° C.)}, 20 parts of finely pulverized anhydrous disodium monohydrogen phosphate having a maximum particle diameter (with Coulter counter) of 13 μ and a median diameter of 6.4 μ (particles having a diameter of at least 13 μ is contained less than 0.1% by volume) and 20 parts of muscovite powder having a weight average flake diameter of 20 μ, weight average aspect ratio of 35 and a brightness by Hunter of 50 were blended well. The blend was kneaded through a different direction twin-screw kneader (resin temperature at the outlet: 220° C.), and then melt-extruded through a single-screw extruder connected to the above twin-screw kneader to give blend pellets of a composition.

Then, a multilayered sheet having a construction of, from outside, Polypropylene/adhesive resin/the above composition/adhesive resin/polypropylene (thickness: 550/50/140/50/550 μ was obtained through a co-extrusion sheet former of feed-block type equipped with 3 extruders and a T die.

The polypropylene used here was Ubepolypro E-130D; (trademark) made by Ube Industries, Ltd. and the adhesive resin was Admer-QF-500 (a polypropylene modified with maleic anhydride) made by Mitsui Petrochemical Industries Co.

The thus obtained multilayered sheet was thermoformed into cup-shape container with a round bottom having a radius of 33 mm, a circular open top having a radius of 37 mm and a height of 37 mm using a vacuum air-pressure thermoforminq machine (made by Asano Laboratories . The thickness construction of the cup was, from outside, 204/19/52/19/204 μ (harmonic mean thicknesses). After replacement of inside air by nitrogen gas, the cup was filled with 5 ml of deaerated water and heatsealed with a lid made of a laminate film of aluminum foil/polypropylene. Then the cup was retorted at 120° C. for 30 minutes. After being taken out from the retorting oven, the cup was stored for 6 months at 20° C., 65% RH. The oxygen gas concentration in the cup after the storage was measured by gas chromatography to be 0.26%, which would correspond to an oxygen gas absorption, when the container is packed with an aqueous food, of 3.3 ppm. This concentration value is sufficiently low for protecting various foods from degradation by oxygen.

COMPARATIVE EXAMPLE 1a

Co-extrusion, thermoforming and retorting were carried out in the same manner as in Comparative Example 1-a except for using EVOH (used in Example 1-a) instead of the composition shown in Example 1-a. The obtained container was evaluated for storage performance. The oxygen concentration in the container stored for 1 year was 1.72% and the corresponding oxygen absorption, when the container was packed with an aqueous food, was 22.1 ppm.

EXAMPLES 2-a THROUGH 5-a

Example 1-a was repeated several times using various drying agent powders shown instead of anhydrous disodium hydrogen phosphate, with the same construction of EVOH, drying agent and mica, to obtain various containers. They were evaluated after 1 year of storage. The results are shown in Table 1-a. All the containers showed low oxygen concentrations, proving their high storage performance.

TABLE 1-a

|  | Drying agent | After storage for 1 year | |
|---|---|---|---|
|  |  | Oxygen conc. % | Oxygen absorption, ppm |
| Example 2-a | anhydrous sodium dihydrogen phosphate | 0.27 | 3.5 |
| 3-a | anhydrous trisodium phosphate | 0.28 | 3.6 |
| 4-a | anhydrous trilithium phosphate | 0.27 | 3.5 |
| 5-a | anhydrous sodium pyrophosohate | 0.26 | 3.3 |

TABLE 1-a-continued

|  | After storage for 1 year | |
|---|---|---|
| Drying agent | Oxygen conc. % | Oxygen absorption, ppm |

EXAMPLE 6-a

Example 1-a was repeated except for using phlogopite having a weight average flake diameter of 13 μ and a weight average aspect ratio of 25 to obtain blend pellets of a similar composition having. The pellets were formed into a container in the same manner as in Example 1 -a and the container obtained was evaluated for storage performance. The oxygen concentration in the container stored for 1 year was 0.28% and the corresponding oxygen absorption, when the container was packed with an aqueous food, was 3.6 ppm.

EXAMPLE 7-a 40 parts of EVOH and 20 parts of muscovite both used in Example 1, 20 parts of anhydrous disodium hydrogen phosphate (average particle diameter 5.5 μ) and 20 parts of nylon resin were blended well, and the blend was then formed into blend pellets (Composition-D1 in the same manner as in Example 1. The nylon resin used here was Ubenylon (trademark) 7024B made by Ube Industries, Ltd. The obtained pellets were formed into a multilayered sheet having a construction of PP/ad/Composition-D1/ad/PP, which was then thermoformed into a container, in the same manner as in Example 1. The container was retorted and, after 6 month, measured for the oxygen absorption to give 3.2 ppm.

Obviously, numerous modifications and variations of the present invention are possible in light of the above teachings. It is therefore understood that within the scope of the appended claims, the invention may be practiced otherwise than as specifically described herein.

What is claimed is:

1. A multilayered container comprising a first layer of composition (A) comprising at least one inorganic powder selected from the group consisting of mica, sericite, talc and glass flake in an amount of 5 to 50% by weight of said first layer and a gas barrier resin, and a second layer of composition (B) comprising at least one inorganic powder selected from mica, sericite, talc and glass flake in an amount of 3 to 60% by weight of said second layer and a thermoplastic resin, wherein said gas barrier resin of the first layer is not the same resin as the structural thermoplastic resin of the second layer.

2. The multilayered container of claim 1, wherein said gas barrier resin has an oxygen transmission rate (measured at 20° C., 65% RH) of not more than 300 cc·20μ/m$^2$·day·atm.

3. The multilayered container of claim 1, wherein said gas barrier resin is an ethylene-vinyl alcohol copolymer having an ethylene content of 20 to 50 mol%.

4. The multilayered container of claim 1, wherein said inorganic powder is mica.

5. The multilayered container of claim 1, wherein said layer of composition (B) is positioned inside said layer of composition (A).

6. The multilayered container of claim 1, wherein a drying agent is incorporated in either of said first layer or said second layer in an amount of at least 3% by weight of said layer.

7. The multilayered container of claim 6, wherein said drying agent is a salt capable of forming hydrate.

8. The multilayered container of claim 6, wherein said drying agent is selected from sodium dihydrogen phosphate, disodium hydrogen phosphate, trisodium phosphate, trilithium phosphate and sodium pyrophosphate.

* * * * *